(No Model.)

L. HOPSON.
PROJECTILE.

No. 305,002. Patented Sept. 9, 1884.

Witnesses:
Alx. Scott
Jas. W. McLaw

Inventor:
Lucien Hopson

UNITED STATES PATENT OFFICE.

LUCIEN HOPSON, OF LAMPASAS, TEXAS.

PROJECTILE.

SPECIFICATION forming part of Letters Patent No. 305,002, dated September 9, 1884.

Application filed July 26, 1884. (No model.)

*To all whom it may concern:*

Be it known that I, LUCIEN HOPSON, a citizen of the United States of America, and of the county of Lampasas and State of Texas, have made a new and useful Improvement in Rifle-Balls; and I do hereby declare that the following is a full, clear, and exact description of the construction and operation of the same, reference being had to the annexed drawings, making a part of this specification, in which—

Figure 1:
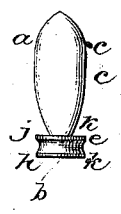
Figure 3:
Figure 2:
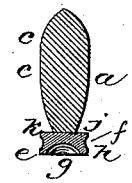
Figure 4:

Figure 1 is a perspective view of the ball and driver; Fig. 2, a longitudinal elevation of the same; Fig. 3, a transverse section of the ball and driver, and Fig. 4 a view of the ball with the charge-container attached.

The ball (Fig. 1) $a$ is an ellipsoidal cone with a truncated apex. The length of the ball should be one-fourth less than its largest circumference. The length of the ball from the apex $i$ to the largest transverse diameter at $c$ is one-fourth of the length of the ball. The length of the ball from $c$ to $c$ is a cylinder equal to one-fourth of the length of the ball. The length of the cylindrical portion from $c$ to $j$, the base, is one-half the length of the ball. The diameter of the base of the ball $j$ varies, according to the size of the ball and the nature of the metal of which it is composed, from one-half to one-fourth of the largest transverse diameter of the ball at $c$. The driver (Fig. 1) $b$ is a perspective view attached to the base of the ball at $j$. The driver (Fig. 1) $b$ is a plano-concave cylinder. In Fig. 2, $b$ is a longitudinal elevation of the driver. A small groove, $f$, extends around the circumference of the driver and in the center of the cylinder, for the purpose of attaching the wrapper to the driver. The groove should be one-eighth of the thickness of the driver in width and one-twelfth the diameter of the driver in depth; but these dimensions may vary according to the size of the ball and the nature of the metal of which the driver is composed.

$e\ e$ are two cylindrical bearings, one on each side of the groove $f$, for the purpose of keeping the driver straight in the bore of the gun. The upper surface of the driver $k\ k$, on which the base of the ball rests, is a plane. The reverse side $g$ is concave, and is two-thirds of the thickness of the driver in depth. The depth of the cup may vary according to the nature of the metal and the size of the ball.

The driver should be composed of lead or some other soft metal, in order to admit of expansion in the bore of the gun, to fill the grooves and prevent windage, and thereby the whole force of the powder is communicated to the ball in the direct line of flight. This arrangement secures all the advantages of the Minié ball without any of its disadvantages. The ball, being coniform and presenting but little surface behind, receives the whole propulsive force of the powder, without any drawback in consequence of the creation of a vacuum in the rear of the ball. The range is therefore greater, and the ball, owing to its tapering rear, is projected with greater force and precision than any other ball.

What I claim as my improvement, and desire to secure by Letters Patent, is—

1. The ellipsoidal projectile $a$, having a flat base, in combination with the plano-concave sabot or driver whose plane face is contiguous to the base of the projectile.

2. In combination with the ellipsoidal projectile having a truncated base, a plano-concave sabot or driver whose plane face is contiguous to the base of the projectile, and whose periphery is grooved for the attachment of the charge-container, substantially as described.

LUCIEN HOPSON.

Witnesses:
SCHUYLER DURYEE,
J. E. ROCKWELL.